Aug. 30, 1927.  1,640,744
G. ZAPF
MEANS FOR PROTECTING CABLES FROM KINKING AT THE POINT WHERE
THEY EMERGE FROM JUNCTION BOXES OR CASINGS
Filed Feb. 5, 1926
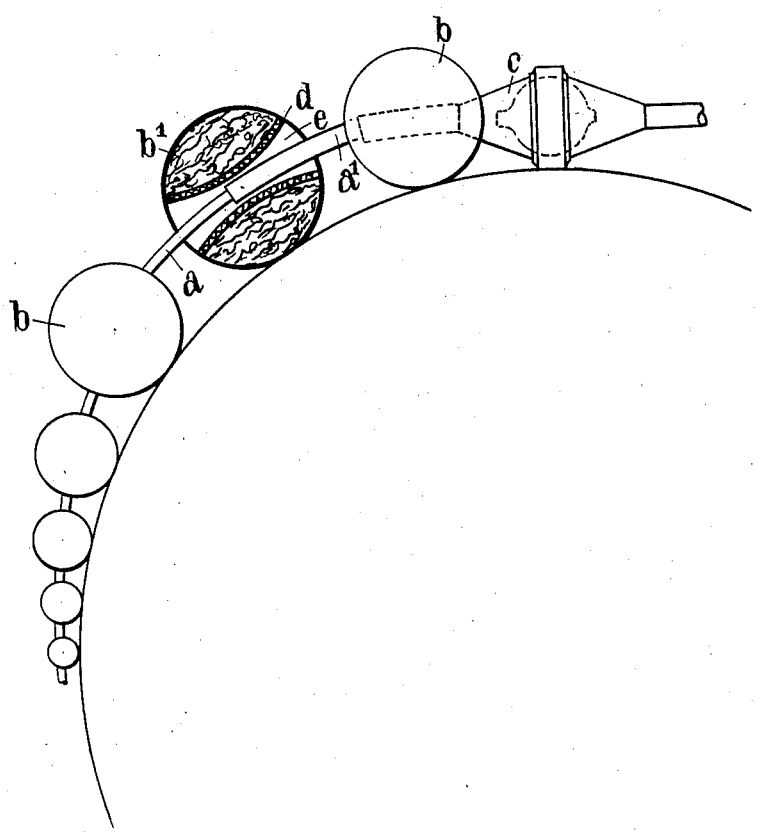
G. Zapf
INVENTOR
By: Marks & Clerk
ATTYS Patented Aug. 30, 1927.

1,640,744

UNITED STATES PATENT OFFICE.

GEORG ZAPF, OF COLOGNE-MULHEIM, GERMANY, ASSIGNOR TO FELTEN & GUILLEAUME CARLSWERK ACTIENGESELLSCHAFT, OF COLOGNE-MULHEIM, GERMANY.

MEANS FOR PROTECTING CABLES FROM KINKING AT THE POINT WHERE THEY EMERGE FROM JUNCTION BOXES OR CASINGS.

Application filed February 5, 1926, Serial No. 86,303, and in Germany April 17, 1925.

The junction boxes or casings used for housing the coils or connections for submarine cables are relatively bulky tubular or spherical structures, which in view of the great water pressure at considerable depths have to be made rigid. When, in laying the cable, such a bulky rigid box runs over the leading sheaves and paying-out drums, the cable is subjected to severe kinking stresses owing to being bent at the point where it leaves the rigid junction box.

The present invention relates to means for preventing the cable kinking at the point where it leaves the junction box and for ensuring gradual bending.

In the accompanying drawing a constructional form of the invention is shown. On the cable $a$ a number of spherical bodies $b$ is strung, the diameter of which decreases as the distance from the junction box increases, so that the cable gradually approaches the periphery of the drum. The spherical form is the most suitable owing to the great mobility of a ball in all directions and owing to the fact that, whatever its position, the cable will always be at the same distance from the supporting surface. Furthermore according to the invention the balls near or immediately next to the junction box $c$ are given a greater diameter than the box, so that the cable shall come straight out of the box without a kink.

The balls, as shown at $b'$ in cross-section, are provided with flared inlet and outlet openings $e$ to enable the cable to bend freely in correspondence with the periphery of the drum. In the middle the bore in the ball is reduced to almost the periphery of the cable which may be gripped by a suitable gripping means at this place. For protecting the cable from damage due to friction the bore of the ball is preferably lined with a layer $d$ of rubber or the like. In order to relieve the tension on the cable, the balls may be connected together by chains or the like.

The thickened parts $a'$ of the cable, shown in the drawing, are the armouring wires which are fixed in the junction box by means of cones and bent back for taking up the pull.

What I claim is:—

1. Means for protecting cables against kinking, where they emerge from a junction box during the laying of the cable when they run over leading sheaves and paying drums, comprising in combination with a cable a series of spherical bodies strung on the cable and capable of coming in direct contact with the leading sheaves and paying drums, the diameters of which spherical bodies decrease the further they are from the junction box, as set forth.

2. Means for protecting cables against kinking, where they emerge from a junction box during the laying of the cable when they run over leading sheaves and paying drums, comprising in combination with a cable a series of spherical bodies strung on the cable and capable of coming in direct contact with the leading sheaves and paying drums, the diameters of which spherical bodies decrease the further they are from the junction box and having the diameters of those lying nearest the junction box larger than the junction box, as set forth.

3. Means for protecting cables against kinking, where they emerge from a junction box during the laying of the cable when they run over leading sheaves and paying drums, comprising in combination with a cable a series of spherical bodies strung on the cable and capable of coming in direct contact with the leading sheaves and paying drums, the diameters of which spherical bodies decrease the further they are from the junction box, a bore extending through each spherical body and being flared from the middle towards each end of the bore and a lining in the said bore for reducing the friction between the spherical body and the cable, as set forth.

4. Means for protecting cables against kinking, where they emerge from a junction box during the laying of the cable when they run over leading sheaves and paying drums, comprising in combination with a cable a series of spherical bodies strung on the cable and capable of coming in direct contact with the leading sheaves and paying drums, the diameters of which spherical bodies decrease the further they are from the junction box, and connecting means between the said spherical bodies for taking up the pull on the cable, as set forth.

In testimony whereof I have signed my name to this specification.

GEORG ZAPF.